(12) United States Patent
Chengalvarayan et al.

(10) Patent No.: US 7,729,911 B2
(45) Date of Patent: Jun. 1, 2010

(54) SPEECH RECOGNITION METHOD AND SYSTEM

(75) Inventors: Rathinavelu Chengalvarayan, Naperville, IL (US); Scott M. Pennock, Lake Orion, MI (US)

(73) Assignee: General Motors LLC, Detroit, MI (US)

(*) Notice: Subject to any disclaimer, the term of this patent is extended or adjusted under 35 U.S.C. 154(b) by 1123 days.

(21) Appl. No.: 11/235,961

(22) Filed: Sep. 27, 2005

(65) Prior Publication Data

US 2007/0073539 A1    Mar. 29, 2007

(51) Int. Cl.
G10L 15/06 (2006.01)
(52) U.S. Cl. .................. 704/245; 704/235; 704/226
(58) Field of Classification Search ........... 704/231, 704/233, 270, 239, 243, 244, 270.1, 245, 704/200, 226; 379/67.1
See application file for complete search history.

(56) References Cited

U.S. PATENT DOCUMENTS

| | | | | |
|---|---|---|---|---|
| 5,742,928 A * | 4/1998 | Suzuki | ............... | 704/239 |
| 5,970,446 A * | 10/1999 | Goldberg et al. | ............ | 704/233 |
| 6,049,594 A * | 4/2000 | Furman et al. | ............ | 379/67.1 |
| 6,631,348 B1 * | 10/2003 | Wymore | ............... | 704/233 |
| 7,103,549 B2 * | 9/2006 | Bennett et al. | ............ | 704/270 |
| 2004/0107097 A1 | 6/2004 | Lenane et al. | ............ | 704/231 |
| 2004/0128140 A1 | 7/2004 | Deisher | | |

OTHER PUBLICATIONS

Juang et al, "Minimum Classification Error Rate Methods for Speech Recognition," IEEE Transactions on Speech and Audio Processing, vol. 5, No. 3, May 1997, pp. 257-265.
Rabiner, "A Tutorial on Hidden Markov Models and Selected Applications in Speech Recognition," Proceedings of the IEEE, Vol. 77, No. 2, Feb. 1989, pp. 257-286.
Wilpon et al, "A Modified K-Means Custering Algorithm for Use in Isolated Word Recognition," IEEE Transactions on Acoustics, Speech, and Signal Processing, vol. ASSP-33, No. 3, Jun. 1985, pp. 587-594.
Zwicker et al, "Basic-Program for Calculating the Loudness of Sounds from their 1/3-Oct Band Spectra According to ISO 532 B," Acoustica, vol. 55, 1984, pp. 63-67.
Bin, Tian, "Res. on Theory and Key Tech. of Practical Chinese Speech Recog.", CN Selected Doctoral Dissertations and Master's Theses, 2004, 36-46; with partial Eng. trans.

* cited by examiner

*Primary Examiner*—Huyen X. Vo
(74) *Attorney, Agent, or Firm*—Dierker & Associates, P.C.

(57) ABSTRACT

A speech recognition method comprising the steps of: storing multiple recognition models for a vocabulary set, each model distinguished from the other models in response to a Lombard characteristic, detecting at least one speaker utterance in a motor vehicle, selecting one of the multiple recognition models in response to a Lombard characteristic of the at least one speaker utterance, utilizing the selected recognition model to recognize the at least one speaker utterance; and providing a signal in response to the recognition.

21 Claims, 5 Drawing Sheets

SPEECH RECOGNITION METHOD AND SYSTEM

TECHNICAL FIELD

This invention relates to an automotive speech recognition method and system.

BACKGROUND

In a known example for building automotive speech recognition systems, speakers or training subjects are grouped based on gender, dialect, or accent. The speakers' utterances are collected over time into a training data set, and an acoustic model for an automotive speech recognition system is trained using the collected training data set. This method assumes that speakers annunciate at a normalized rate and pitch. A recognition system utilizing the model takes as input a signal comprised of acoustic energy emanating from a speaker as an utterance and determines the probability of a match of the signal to a word or a phrase, or set of words or phrases. Speaker utterances are collected in an environment with little or no background noise, resulting in a noise-free data set to develop or train an acoustic model.

In an automotive environment, users of automotive speech recognition systems speak in different ways depending on the background noise within a vehicle interior. Many users increase utterance volume and pitch as vehicle interior background noise increases in intensity. Vehicle interior background noise is influenced by, for example, the type of road the vehicle is traversing, the speed the vehicle travels, wind noise, noise external to the vehicle, HVAC settings, and other factors. Variations in user utterance volume and pitch coupled with varying external and internal background noise may represent challenges in associating the acoustic model with the user and obtaining recognition of the utterances.

SUMMARY OF THE INVENTION

Advantageously, this invention provides a speech recognition method and system.

Advantageously, according to an example, a speech recognition method comprises the steps of: storing multiple recognition models for a vocabulary set, each model distinguished from the other models in response to a Lombard characteristic, detecting at least one speaker utterance in a motor vehicle, selecting one of the multiple recognition models in response to a Lombard characteristic of the at least one speaker utterance, utilizing the selected recognition model to recognize the at least one speaker utterance, and providing a signal in response to the recognition.

Advantageously, according to another example, a speech recognition system comprises memory containing multiple recognition models for a vocabulary set, each recognition model distinguished from the other recognition models in response to a Lombard characteristic, a sound-detecting device receiving at least one speaker utterance, a processing device containing control structure executed to select one of the multiple recognition models in response to a Lombard characteristic of the at least one speaker utterance, utilizing the selected recognition model to recognize the at least one speaker utterance, and provide a signal in response to the recognition.

In yet another example, a speech recognition system comprises a vocabulary recording subsystem for recording utterances of a desired vocabulary from a plurality of speakers and storing data from the recorded utterances as a corpus, wherein background noise is audible to each speak but not contained in the recorded utterances; a mixing device for combining various background sounds with the recorded utterances; and a data structure containing at least two models of the desired vocabulary, wherein the models are responsive to the mixing device and wherein each model is distinct from the other in response to a Lombard characteristic of at least a portion of the corpus.

DESCRIPTION OF AN EXEMPLARY EXAMPLE

Figure 1:
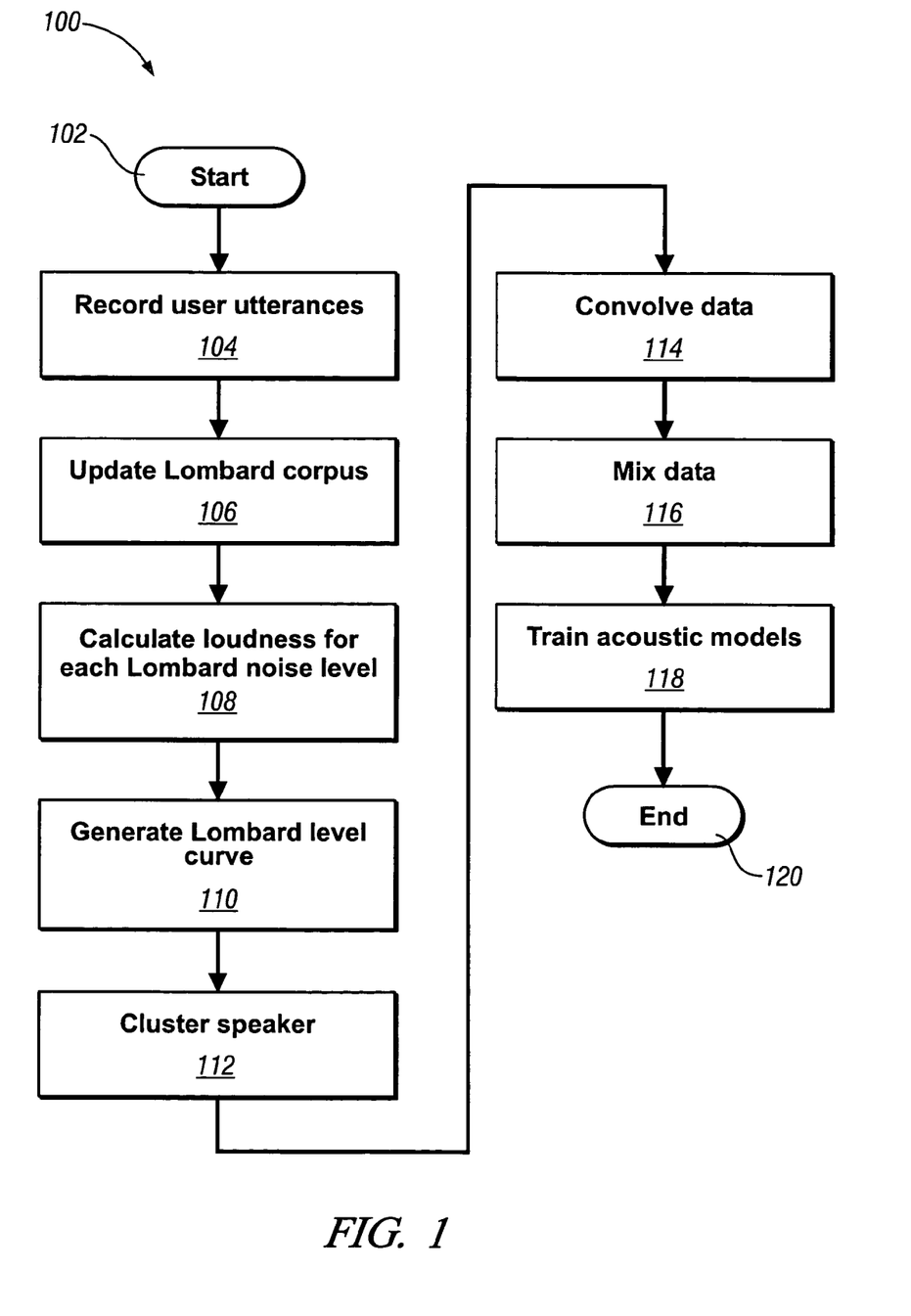
FIG. 1 illustrates example steps for generating acoustic models.

Referring to FIG. 1, the steps 100 begin at 102. It is understood that the utterances are spoken by one or more training subjects located at a development, test, or recording facility or vehicle.

At step 104, speaker utterances are recorded for use as speaker data. In this example, speaker data are the recorded speaker utterances utilized to associate the speaker with an acoustic model. A person wearing a headset with a boom microphone sits at in front of a computer display and responds to a set of guided utterances prompted by the display under computer program control. A guided utterance is a request from the recording system to the speaker to utter words or phrases known to a speech recognition acoustic model, such as the utterance of the number "two" or the phrase "place a call."

The speaker is prompted to speak the vocabulary being modeled with different levels of noise introduced into the speaker's headphones. The levels of noise simulate different types of in-cabin noise that a vehicle experiences when on the road. Types of noise include cabin HVAC blower, road noise at different vehicle speeds and on different types of roads, wind noise such as occurs when a vehicle window is open during driving and other noises that may occur in a vehicle cabin. Thus at step 104, each speaker is prompted through the vocabulary being trained and is prompted to repeat each word or phrase in the vocabulary for each noise level to be introduced in the speaker's headphones.

At step 106, the corpus, or set of utterances, with Lombard information is updated. For example, a Lombard corpus may be comprised of a set of 48 kHz 16 bit signals recorded by many different people; for some applications, 500 speakers may make a suitable corpus.

At step 108, the loudness levels of the recorded utterances are determined. One example determination of a loudness level is measuring the RMS (root mean square) level of a time domain signal and assigning appropriate units. Another example determination of a loudness level, is to measure the loudness in units comprised of sones. Measuring loudness in sones is advantageous in that sones approximate the perceived loudness of a sound. For example, if a person were subjected to a sound level of five sones, then subjected to a sound level of ten sones, the person would usually report that the sound level of ten sones was perceived as being twice as loud as the sound level of five sones. This approach is advantageous when correlating changes in speaker behavior with respect to corresponding changes in background noise levels.

In another example, the loudness is calculated by providing a power density spectrum of a given audio signal or speaker utterance to a ⅓ octave filter bank. Calculating the loudness level of a given audio signal by a ⅓ octave filter bank is specified in the International Standard ISO 532 B. Sone units corresponding to the loudness levels are assigned responsive to the calculation.

The loudness calculated at step 108 is the loudness of the utterances recorded at step 104. Each recording has associated data identifying the level of the noise introduced into the speaker headphone during the prompting at step 104 and the loudness of the introduced noise is the Lombard level for each utterance. The Lombard level unit of loudness may also be in sones.

In this example, Lombard levels are set at discrete intervals and the Lombard level of each utterance in the corpus is associated with the closest discrete set level. For example, the levels may be set as low, medium, and high relative to the expected Lombard noise ranges for a particular motor vehicle. More than three levels may be set if desired.

A Lombard level curve is generated in step 110. The Lombard curve is generated by classifying the utterances at differing loudness levels in sones on the Cartesian ordinate or Y-axis to Lombard levels on the abscissa or X-axis then interpolating between the classified utterances.

Figure 4:
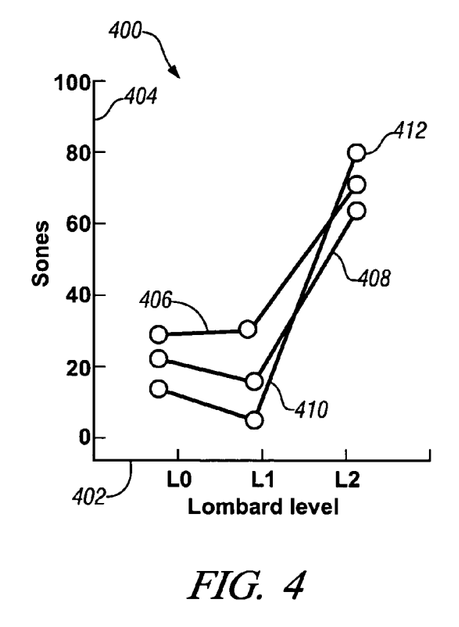
FIG. 4 illustrates Lombard level curves for an example three speaker data cluster.

At step 112, the speaker utterances are classified into clusters based upon Lombard characteristics. In one example, the clusters are based upon characteristics of their Lombard curves. This can be better understood with reference also to FIGS. 4 and 5. In FIG. 4, sets of utterances from various speakers (represented by curves or graphs 406, 408 and 410) are plotted as described above, with plots represented by, for example, reference 412. The plotted graphs 406, 408 and 410 all have a characteristic that, as the Lombard level increases above L1 to L2 (L2>L1>L0), the voice levels (e.g., loudness) of the recorded utterances increase. Utterance patterns falling into this similar behavior are then grouped into one cluster.

Figure 5:
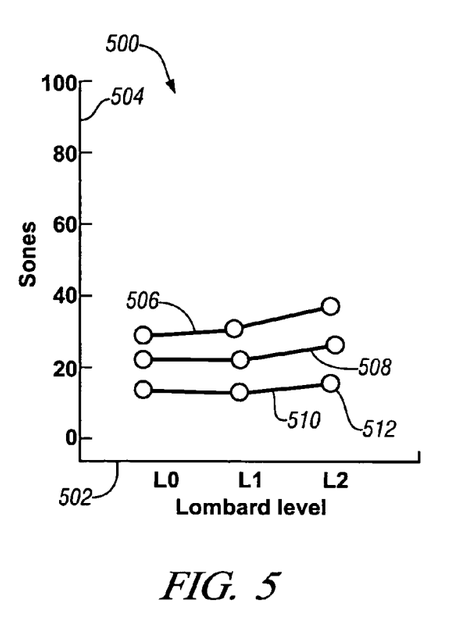
FIG. 5 illustrates Lombard level curves for another example three speaker data cluster.

In FIG. 5, sets of utterances from other speakers (represented by curves or graphs 506, 508 and 510) are plotted, for example, as designated by reference 512, and all have a characteristic that, as the Lombard level increases, the voice levels of the recorded utterances tend to stay flat. Thus, these speakers represent a characteristic of not tending to raise their voices as background noise level increases.

Thus as can be seen, speaker Lombard curves with similar characteristics are placed in a particular data structure characterized by bounding parameters describing the Lombard level versus range of sones, such as Lombard level 0 corresponding to a sone level ranging from 10 to 25 sones, Lombard level 1 corresponding to a level ranging from 30 to 40 sones, and Lombard level 2 corresponding to a level ranging from 65 to 80 sones. Within clusters, other sub-clusters known in the speech signal processing art may be further defined based on gender and dialect, including regional dialects within a given cluster. For example, consistent differences between a set of male speakers versus a set of female speakers may result in placing the Lombard level curves in separate but similar clusters within an acoustic model, or within separate acoustic models.

While in the above example the Lombard clusters are generated based upon the Lombard curves, other alternatives based upon Lombard characteristics may also be implemented. For example, the Lombard clusters may be based upon partial curves; in the example in FIGS. 4 and 5, the L0 to L1 plots may represent a set of partial curves and the L1 to L2 plots may represent another set of partial curves.

In yet another example, Lombard clusters may be generated based upon the Lombard level itself. Thus at each of levels L0, L1 and L2, clusters for different utterance loudnesses can be grouped based upon discrete loudness level boundaries.

In setting the Lombard clusters, the system designer will determine the number of Lombard and utterances loudness levels for classification as appropriate for the specific application. In addition, the loudness level boundary points will be set as discrete levels within the expected loudness range for the given application.

Once the Lombard clusters are set, the data for each cluster is processed to train the models. In general, each cluster is used to train a model of the vocabulary for the recognition application. As part of this process at step 114, the speaker data in each cluster is convolved in a known manner.

Generally, convolving entails a mathematical operator that takes two functions f and g and produces a third function that represents an overlap between f and a reversed and translated version of g. Convolution may be intuitively conceptualized as a blurring of a signal or the blurring of one or more sounds with respect to one or more objects. For example, an echo is a convolution of an original sound or speaker utterance with a function representing the objects that reflect the original sound or speaker utterance, wherein f may be the utterance and g may be the function representing the reflective objects. An advantage of this process is that the convolving may be used to simulate specific vehicle cabin acoustic characteristics. In this example, speaker data is convolved with no external noise inputs. For example, the speaker data may be convolved when a vehicle is standing still with the ignition off.

Figure 2:
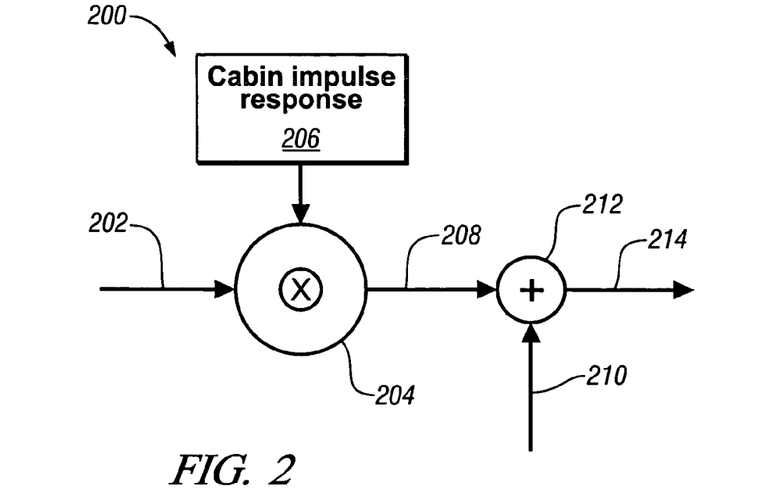
FIG. 2 provides an example schematic of convolving and mixing non-vehicle specific speech data with vehicle specific information.

Example convolving steps are illustrated in FIG. 2. The non-specific recordings 202 and a vehicle cabin impulse response 206 are convolved at 204. An impulse response is a measurement of sound pressure versus time. Further, an impulse response is the manner in which a device, in this example a vehicle cabin and a microphone or microphone array, behaves after acoustic energy input has ceased. The energy in an impulse is spread evenly over a wide frequency band, making it convenient for use as a test signal to measure the characteristics of an audio system or apparatus. The vehicle cabin impulse response 206, in one example, is for a particular class or line of vehicles, such as, for example, a mid-size truck line with similarly designed interiors and can be measured for each vehicle in a manner known to those skilled in the art.

Figure 3:
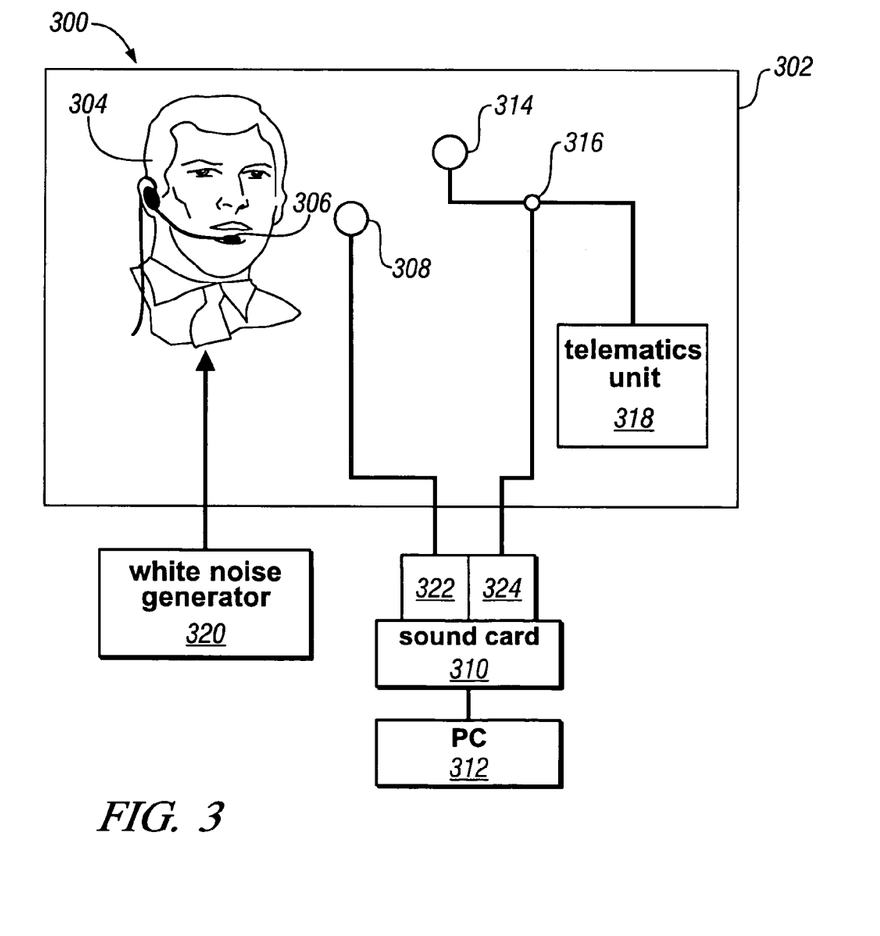
FIG. 3 is an example schematic of a system for determining vehicle cabin impulse response.

Referring now to also to FIG. 3, determination of vehicle impulse response for use in the convolving step 204 may be made with the system shown. A head and torso simulator (HATS) 304 is placed in a vehicle cabin 302. Attached to the HATS is a speaker 306 in a position that simulates the position of a human mouth. White noise sourcing from a white noise generator 320 is played through speaker 306.

A microphone 308 is placed at the acoustic point of the HATS 304 speaker. The acoustic point is a point where utterances from a user are recorded. In one example, an acoustic point for recording a user utterance is fifty millimeters from the lip plane of the user. Microphone 308 is connected to a sound card 310 and transmit the audio signal generated by the HATS 304 speaker 306 to the sound card 310 channel one 322 for processing.

The vehicle cabin contains a built-in microphone 314 connected to a telematics unit 318. The built-in microphone 314 is used during vehicle operation. A high impedance tap 316 is connected to the output of built-in microphone 314 and to the sound card 310. The high impedance tap 316 transmits the audio signal generated by the HATS 304 speaker 306 to the sound card 310 channel two 324 for processing.

Sound card 310 is connected to a personal computer (PC) 312. PC 312 utilizes the incoming audio data on sound card 310 channel one 322 and channel two 324 to determine the correlation and/or covariance between the audio signal received at channel one 322 and channel two 324, thus yielding the impulse response of the vehicle cabin 302 and microphone 314.

Referring back to FIG. 2, the output of the convolving step 208 is each specific utterance convolved with the impulse response for the particular class or line of vehicles.

Referring again to FIG. 1, the convolved data is mixed with the vehicle specific noise for a variety of vehicle operating conditions. This is illustrated in FIG. 2 with the vehicle specific noise 210 introduced and mixed with the convolved output 208 at 212 and the result is represented by reference 214. In this example, the step of mixing comprises adding the vehicle specific noise to the convolved signal 208. The vehicle specific noise is comprised of ambient noise recordings within the vehicle at different speeds, along with varied interior and exterior ambient noise combinations. Example conditions for recording vehicle noise may be: (a) the vehicle traveling at forty-five miles per hour over a segmented concrete road with the air conditioning system set at level three; (b) the vehicle traveling at sixty miles per hour on a blacktop surfaced road with the driver and passenger's windows lowered, etc. A system designer can readily set a variety of conditions to create vehicle noise sets for use in this process.

The output signals 214 now comprise sets of processed utterances that have been convolved to the response characteristic of the specific vehicle environment and that have been combined with the background noise for a variety of vehicle conditions. These data sets, originally defined by their Lombard characteristic, can be further processed to refine the Lombard classifications, for example by plotting the loudness of the signals 214 versus the Lombard level. Further classification may result in refined models for recognition but is not necessary.

Referring again to FIG. 1, at step 118, the acoustic models classified based upon the Lombard clusters (as refined and further classified based upon the convolving and mixing above, if desired) are trained in a known manner. The modeling may be any acceptable modeling known to those skilled in the art upon implementation, it being recognized that new modeling techniques become available or are refined over time.

In one example, the acoustic models are trained using Bayes' rule, expressed as P(words|signal)=P(words)P(signal|words)/P(signal). Given a signal, a word sequence is searched to maximize the probability of specific words given the signal, or P(words|signal). In a known example, Markov modeling provides a mathematically rigorous approach to developing robust statistical speech models.

In HMM-based speech recognition, the maximum likelihood estimation (MLE) is the most popular method for training model parameters. In MLE training the likelihood function of speech data is maximized over the models of given phonetic classes. The maximization is carried out iteratively using either Baum-Welch algorithm or the segmental K-means algorithm. A classification error (MCE) can be used to minimize the expected speech classification or recognition error rate. MCE is known and has been successfully applied a variety of popular structures of speech recognition including the HMM, dynamic time warping, and neural networks.

The resulting trained acoustic models represent the clustered speaker data, convolved with vehicle cabin acoustics, and mixed with vehicle operating noise conditions. A well-trained acoustic model according to speaker Lombard level and vehicle cabin acoustic characteristics may better match the test condition scenarios, minimize degradation of recognition due to severe mismatches, and boost the performance.

Figure 6:
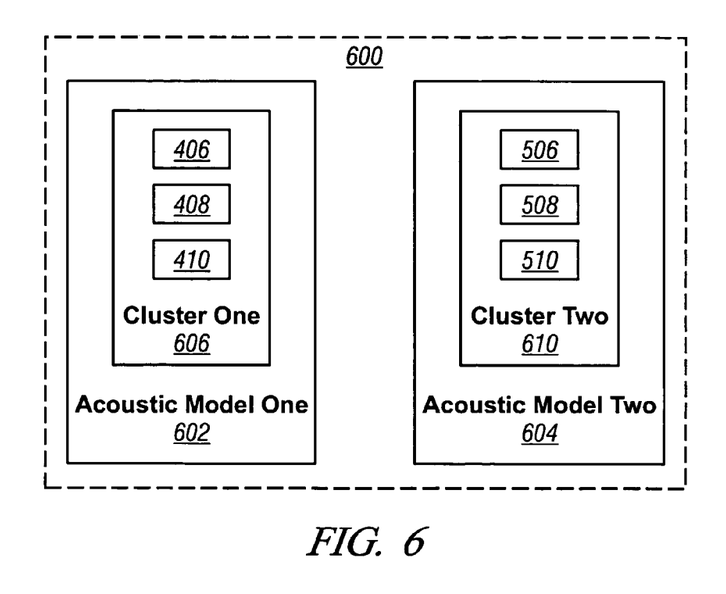
FIG. 6 separate speaker models responsive to a Lombard characteristic.

Referring now to FIG. 6, vocabulary models 602 and 604 for use in a speech recognition device are shown. FIG. 6 shows only two models for illustration purposes, it being understood that further models are used if further classifications are defined by the implementer of the system. The two models 602 and 604 each represent a complete set of the vocabulary for the recognition application and schematically illustrate that they are based upon the Lombard clusters or classified data (606, 610) described above with reference to FIGS. 1-5 and the utterances from various speakers 406, 408, 410 and 506, 508, 510 from the Lombard corpus. Thus in general, during operation of a speech recognition device, the model 602, 604 selected to recognize a particular phrase or utterance spoken by a user of the device is selected based upon a match of the speaker to the model 602, 604. This can be better understood with reference to FIG. 7.

Figure 7:
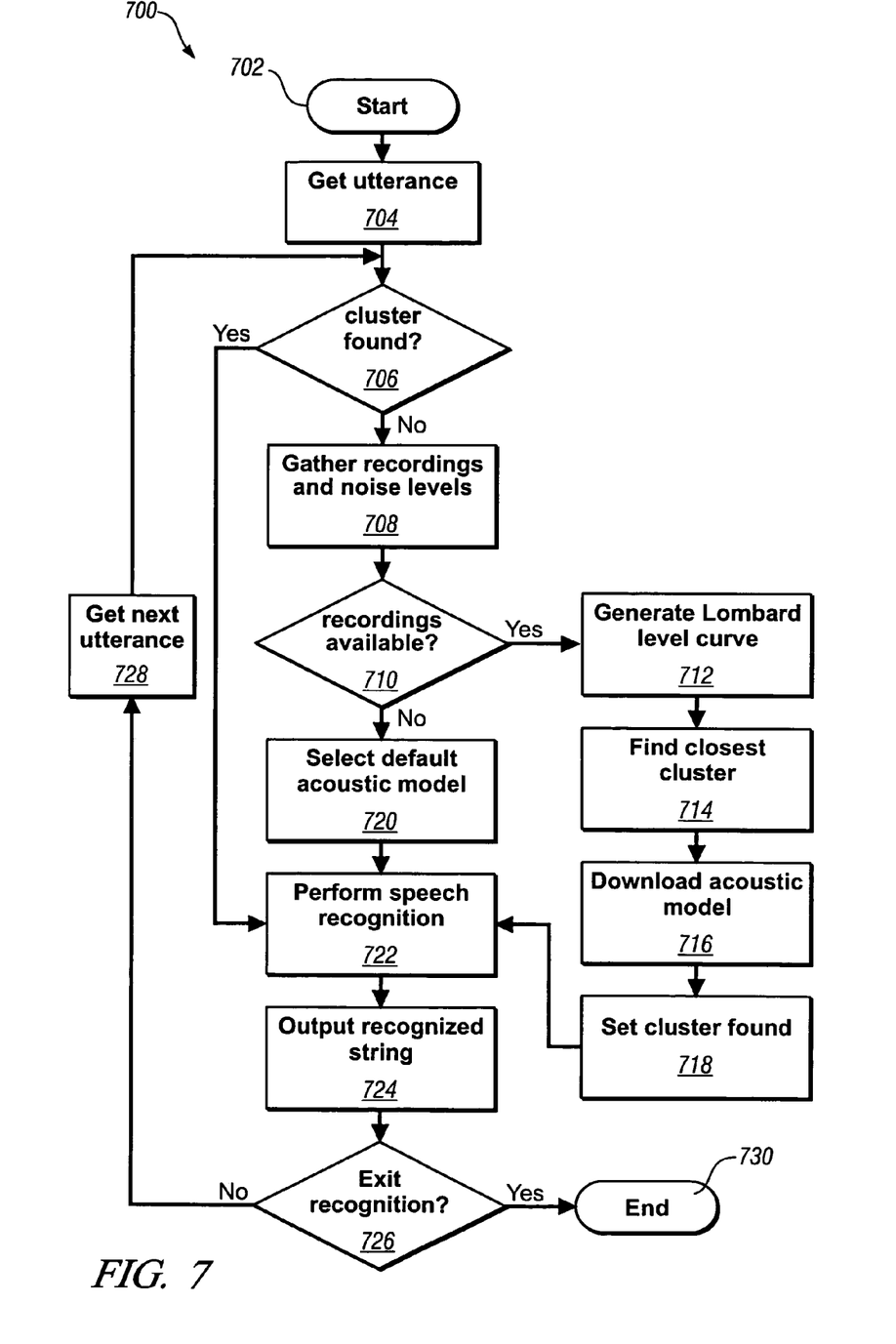
FIG. 7 illustrates example steps for recognition using a Lombard characteristic.
Figure 8:
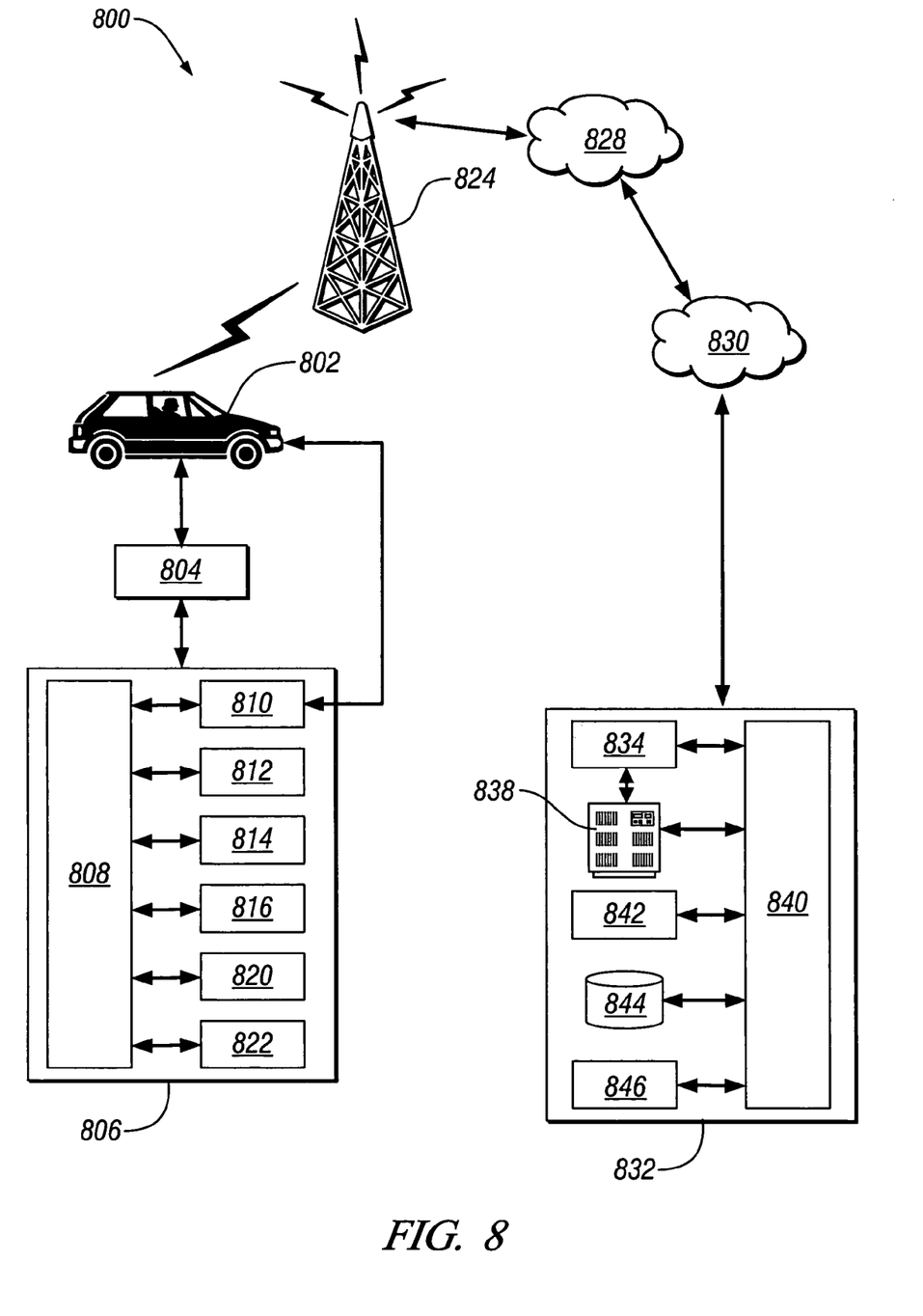
FIG. 8 illustrates a schematic system for use with the steps illustrated in FIG. 7.

Referring now to FIGS. 7 and 8, the steps 700 shown begin at 702. In this example, the user of the system is an occupant of a mobile vehicle 802 using an automotive speech recognition system.

At step 704, an utterance from a user is detected by an in-vehicle microphone 816 operatively coupled to an in-vehicle telematics unit 806.

At step 706, the recognition system attempts to match the speaker utterance to a classification-based model (for example, 602, 604 in FIG. 6). If the models are based upon Lombard curves, it may take more than one utterance before the system can match a user to a model. It is anticipated that the models are stored locally in the in-vehicle unit 806, but the system may also be distributed, in which case the model may be stored remotely, or in which case models may be kept in the vehicle units, but retrieved from a remote facility if a better model is available than one stored locally in the vehicle.

If no matching model is found at step 706, then the recorded utterance is stored so that the in-vehicle system can collect data points and define a Lombard curve for the user. If this approach is used, then step 710 determines whether enough points are obtained for a user, and if so, implements steps 712, 714, 716 and 718 to generate a Lombard curve for the user, send the data to a remote station where a model based upon the closest Lombard cluster is selected 714 and downloaded 716 to the vehicle telematics unit 806. The downloaded model is then selected at 718 and used for speech recognition 722.

Under the data transfer rates of certain networks, the selecting and downloading may not occur quickly enough to process the utterance, so a default model is selected for the utterance pending recognition and for which no matching model was found at step 706. The downloaded model may be used for future recognitions.

Using either the selected model from step 706, step 718 or step 720, as applicable, the speech recognition is performed on the utterances and a data string is output at step 724 in a known manner. Step 726 checks whether further utterances are to be processed and if so moves to step 728. Otherwise the recognition process ends at step 730 and the output string is utilized in a known manner as a command or output signal for the telematics unit 806 (or other in-vehicle device).

While the above example describes utilizing the model classification in an in-vehicle environment, it may also be used in remote voice recognition where the in-vehicle user is speaking to an application hosted at a remote station. In this example, the remote station performs the recognition, including storing, selecting and utilizing the appropriate model as described herein.

As described above, the acoustic model classification need not be set on Lombard curve, but may be set on partial curve or on Lombard level, or on noise level within a Lombard classification. While the above steps illustrate use of Lombard classification, it is understood that this is supplemental to other known classifications for voice recognition and may be used in conjunction therewith.

In the schematic system shown in FIG. 8, the system 800 includes a vehicle 802, a vehicle communication bus 804, a telematics unit 806, a two-way radio frequency communication system (including but not limited to one or more wireless carrier systems 824, one or more communication networks 828, and/or one or more land networks 830), and one or more call centers 832. In one example, vehicle 802 is a motor vehicle with suitable hardware and software for transmitting and receiving voice and data communications.

In an example, via vehicle communications bus 804, the vehicle sends signals from the telematics unit 806 to various units of equipment and systems within the vehicle 802 to perform various functions, such as, for example unlocking doors, and executing personal comfort settings. Communications bus 804 is comprised of interfaces such as, for example, a controller area network (CAN), ISO standard 11989 for high-speed applications, ISO standard 11519 for lower speed applications, and/or Society of Automotive Engineers (SAE) standard J1850 for high speed and lower speed applications.

The telematics unit may send and receive radio transmissions to and from wireless carrier system 824. In one example, wireless carrier system 824 may be an analog or digital cellular telephone system for transmitting signals between the vehicle 802 and communications network 828/830. Further, the wireless carrier system 824 may include a cellular communication transceiver, a satellite communication transceiver, a wireless computer network transceiver (a non-limitative example of which includes a wide area network (WAN) transceiver, and/or combinations thereof).

Telematics unit 806 may include a processor 808 operatively coupled to a wireless modem 810, a location detection system 812 (for example, a global positioning system (GPS)), an in-vehicle memory 814, a microphone 816, one or more speakers 820, and an embedded or in-vehicle compatible phone 822. These devices may either be within or external to and operationally coupled with the telematics unit 806. For example, speakers 820 may be components of the vehicle audio system with which the telematics unit 806 interacts in a known manner.

Processor 808 may be a microcontroller, a controller, a microprocessor, a host processor, and/or vehicle communication processor. In another example, processor 808 may be an application specific integrated circuit (ASIC). Alternatively, processor 808 may be a processor working in conjunction with a central processing unit (CPU) performing the function of a general-purpose processor.

In an example using a GPS receiver, the GPS receiver provides latitude and longitude coordinates of the vehicle 802 responsive to a GPS broadcast signal received from a GPS satellite constellation (not shown). Other examples of the location detection system 812 include a Global Positioning System receiver, a radio triangulation system, a dead reckoning positioning system, and/or combinations thereof. In-vehicle mobile phone 822 may be a cellular type phone, such as, for example, an analog, digital, dual-mode, dual-band, multi-mode and/or multi-band cellular phone. In-vehicle mobile phone 822 may include a separate processor (not shown).

Processor 808 may execute various computer programs that interact with operational modes of electronic and mechanical systems within the vehicle 802. It is to be understood that processor 808 controls communication (e.g., call signals) between the telematics unit 806, wireless carrier system 824, and the call center 832.

Further, processor 808 may generate and accept digital signals transmitted between the telematics unit 806 and the vehicle communication network 804, which is connected to various electronic modules in the vehicle 802. In one example, these digital signals activate the programming mode within the electronic modules, as well as provide for data transfer between the electronic modules.

It is to be understood that the software resident in the processor 808 or memory 814 associated with processor 808 may be utilized for monitoring, recognizing and/or recording the incoming user utterances.

The communications network 824 may include services from one or more mobile telephone switching offices and/or wireless networks. Communications network 828 connects wireless carrier system 824 to land network 830. Communications network 824 may be any suitable system or collection of systems for connecting the wireless carrier system 824 to the vehicle 802 and the land network 830.

The land network 830 connects the communications network 828 to the call center 832. In one example, land network 830 is a public switched telephone network (PSTN). In another example, land network 830 is an Internet Protocol (IP) network. In still other examples, land network 830 is a wired network, an optical network, a fiber network, another wireless network, and/or combinations thereof. The land network 830 may be connected to one or more landline telephones. It is to be understood that the communication network 828 and the land network 830 connect the wireless carrier system to the call center 832.

Call Center 832 contains one or more voice and/or data modems 834, one or more data switches 838, one or more communication service managers 842, one or more communication services databases containing subscriber profile records and/or subscriber information, one or more communication service advisors 864, and one or more network systems 840.

Communication service databases, in one example, contain one or more acoustic models (FIG. 6, 602, FIG. 6, 604) containing the Lombard level user clusters (FIG. 6, 606, FIG. 6, 610) to be downloaded to a vehicle 802 telematics unit 120.

Modem 834 in one example is directly connected to data switch 838. In another example, modem 834 communicates with data switch 838 via network 840 and connects to land network 830. Modem 834 transmits voice and/or data transmissions from call center 832 and receives voice and/or data transmissions from telematics unit 806 in vehicle 802 through wireless carrier system 824, communications network 828, and land network 830. Switch 838 receives data transmissions from, or sends data transmissions to one or more communication service managers 842 via one or more network systems 840.

Call center 832 may contain one or more service advisors 846. In one example, service advisor 846 may be human. In another example, service advisor 846 may be an automaton.

While several examples have been described in detail, the foregoing description is to be considered exemplary rather than limiting.

The invention claimed is:

1. A speech recognition method, comprising:
   storing multiple recognition models for a vocabulary set, each model classified according to a Lombard cluster, wherein each model is distinguishable from the other models based on a Lombard characteristic, the Lombard characteristic representing changes in an utterance pitch and volume in the presence of background noise;
   detecting at least one speaker utterance in a motor vehicle;
   selecting, via a processing device, one of the multiple recognition models in response to a Lombard characteristic of the at least one speaker utterance;
   utilizing the selected recognition model to recognize the at least one speaker utterance; and
   providing a signal in response to the recognition.

2. The method according to claim 1, further comprising building the stored multiple recognition models by:
   recording utterances from a plurality of persons, wherein at least some of the recorded utterances are made with background noise audible to each person but not included in the recording of the utterances, and wherein the background noise is varied with different recordings to create a Lombard corpus; and
   classifying the recorded utterances in response to the Lombard characteristic to create a plurality of classifications.

3. The method according to claim 2 wherein the building further comprises:
   convolving data in the Lombard corpus with a response characteristic of a vehicle;
   adding noise to the convolved data; and
   training the multiple recognition models based on a result of the adding, wherein each recognition model corresponds to one of the plurality of classifications.

4. The method of claim 3 wherein the noise added to the convolved data represents vehicle ambient noise at various operating conditions of the vehicle.

5. The method of claim 2 wherein the Lombard characteristic includes a Lombard level of the background noise.

6. The method of claim 1 wherein the Lombard characteristic includes a curve representing speaker utterances correlated to changing background noise.

7. The method of claim 6, further comprising storing the detected speaker utterances in a memory by determining a Lombard curve of a plurality of detected speaker utterances, wherein the selecting of the one of the multiple recognition models is in response to the determined Lombard curve.

8. The method of claim 1 wherein the Lombard characteristic includes a partial curve of speaker utterances in response to changing background noise.

9. The method of claim 1 wherein the Lombard characteristic includes a background noise level audible to a speaker during an utterance.

10. The method of claim 1, further comprising selecting a default model if a model matching the Lombard characteristic of the at least one speaker utterance is not available.

11. The method of claim 1, further comprising transmitting data responsive to the at least one speaker utterance to a remote station, wherein the selecting of the one of the multiple recognition models is performed at the remote station.

12. The method of claim 11, further comprising downloading the selected recognition model to an in-vehicle device.

13. The method of claim 11 wherein the recognizing is performed at the remote station.

14. The method of claim 1 wherein the recognizing is performed by an in-vehicle device.

15. A speech recognition system, comprising:
   memory containing multiple recognition models for a vocabulary set, each recognition model trained according to a Lombard cluster of utterances, wherein each model is distinguishable from the other models based on a Lombard characteristic, the Lombard characteristic representing changes in an utterance pitch and volume in the presence of background noise;
   a sound-detecting device receiving at least one speaker utterance; and
   a processing device containing control structure executed to: select one of the multiple recognition models in response to a Lombard characteristic of the at least one speaker utterance; utilize the selected recognition model to recognize the at least one speaker utterance; and provide a signal in response to the recognizing.

16. The system of claim 15 wherein the sound-detecting device is in a motor vehicle.

17. The system of claim 16 wherein the processing device is located at a station remote from the motor vehicle.

18. The system of claim 15 wherein the processing device is integrated into a motor vehicle.

19. A speech recognition system, comprising:
   a vocabulary recording subsystem for recording utterances of a desired vocabulary from a plurality of speakers and storing data from the recorded utterances as a corpus, wherein background noise is audible to each speaker but not contained in the recorded utterances;
   a mixing device for mixing various background sounds with the recorded utterances; and
   a data structure containing at least two models of the desired vocabulary, each of the at least two models classified according to a Lombard cluster, wherein each of the models are responsive to the mixing device, and wherein each of the models is distinguishable from the other based on a Lombard characteristic of at least a portion of the corpus, the Lombard characteristic representing changes in an utterance pitch and volume in the presence of background noise.

20. The speech recognition system of claim 19 wherein at least one copy of the data structure is located in a motor vehicle.

21. The speech recognition system of claim 19, further comprising a convolving device configured to convolve the recorded utterances with a signal representative of a vehicle acoustic response and to provide the recorded utterances to the mixing device.

* * * * *